US012629871B2

(12) United States Patent　　(10) Patent No.:　US 12,629,871 B2
Scherer et al.　　　　　　　　　　　(45) Date of Patent:　　May 19, 2026

(54) CLOSURE DEVICES AND MOLD COMPONENTS FOR MOLDING CLOSURE DEVICES

(71) Applicant: HUSKY INJECTION MOLDING SYSTEMS LTD., Bolton (CA)

(72) Inventors: Stephan Scherer, Trierweiler (DE); Tobias Naumann, Merzig (DE)

(73) Assignee: Husky Injection Molding Systems Ltd., Bolton (CA)

( * ) Notice: Subject to any disclaimer, the term of this patent is extended or adjusted under 35 U.S.C. 154(b) by 145 days.

(21) Appl. No.: 18/263,475

(22) PCT Filed: Dec. 22, 2021

(86) PCT No.: PCT/CA2021/051870
§ 371 (c)(1),
(2) Date: Jul. 28, 2023

(87) PCT Pub. No.: WO2022/170416
PCT Pub. Date: Aug. 18, 2022

(65) Prior Publication Data
US 2024/0025095 A1　　Jan. 25, 2024

Related U.S. Application Data

(60) Provisional application No. 63/164,249, filed on Mar. 22, 2021, provisional application No. 63/148,654, filed on Feb. 12, 2021.

(51) Int. Cl.
B65D 55/16　　　　(2006.01)
B29C 45/00　　　　(2006.01)
　　　　　　(Continued)

(52) U.S. Cl.
CPC ...... B29C 45/0081 (2013.01); B29C 45/0017 (2013.01); B65D 41/3447 (2013.01);
　　　　　　(Continued)

(58) Field of Classification Search
CPC ................ B65D 55/16; B65D 41/3428; B65D 41/3447; B65D 2251/1008; B65D 2401/30
See application file for complete search history.

(56) References Cited

U.S. PATENT DOCUMENTS

| | | | |
|---|---|---|---|
| 5,215,204 A | 6/1993 | Beck et al. | |
| 6,474,491 B1 | 11/2002 | Benoit-Gonin et al. | |

(Continued)

FOREIGN PATENT DOCUMENTS

| | | | |
|---|---|---|---|
| CA | 2990674 A1 | 9/2018 | |
| CA | 3082235 A1 | 6/2019 | |

(Continued)

*Primary Examiner* — Allan D Stevens
(74) *Attorney, Agent, or Firm* — Wolf, Greenfield & Sacks, P.C.

(57) ABSTRACT

A molding apparatus for molding a closure device for a container. The closure device may be tethered to the container, and may open and close via a hinged articulation. The closure device includes a cylindrical body comprising hinge-connecting areas with pockets formed in the interior wall and defining an inner surface of the hinge-connecting areas, and hinges extending downwardly from the hinge-connecting areas and positioned at or below a bottom edge of the cylindrical body. The molding apparatus comprises a cavity insert component and a core component that cooperate to form mold surfaces to mold the closure device such that hinges are located below the cap area of the closure device, and hinge-connecting areas formed by projections in the core mold component and recesses in the cavity mold component are located within the cap area are flanked by membranous areas.

15 Claims, 11 Drawing Sheets

(51) Int. Cl.
  B65D 41/34 (2006.01)
  B29L 31/56 (2006.01)

(52) U.S. Cl.
  CPC ...... B65D 55/16 (2013.01); *B29C 2045/0093*
      (2013.01); *B29K 2905/10* (2013.01); *B29L*
      *2031/565* (2013.01); *B65D 2401/30* (2020.05);
      *B65D 2401/50* (2020.05)

(56) References Cited

U.S. PATENT DOCUMENTS

| | | | |
|---|---|---|---|
| 9,010,555 B2 | 4/2015 | Luzzato et al. | |
| 9,108,774 B2 * | 8/2015 | Kwon | B65D 41/3428 |
| 2012/0024815 A1 | 2/2012 | Kwon | |
| 2012/0285921 A1 | 11/2012 | Kwon | |
| 2019/0344933 A1 | 11/2019 | Kim et al. | |

| | | | |
|---|---|---|---|
| 2020/0207525 A1 | 7/2020 | Sung | |
| 2020/0407124 A1 | 12/2020 | Caszatt et al. | |
| 2021/0371177 A1 * | 12/2021 | Berge | B65D 41/3442 |
| 2022/0055804 A1 * | 2/2022 | Khattar | B65D 55/16 |

FOREIGN PATENT DOCUMENTS

| | | | |
|---|---|---|---|
| CA | 3137383 A1 | 11/2020 | |
| CN | 203767256 U | 8/2014 | |
| CN | 111924311 A | 11/2020 | |
| ES | 1266291 U | 4/2021 | |
| JP | S49-096441 A | 9/1974 | |
| JP | 2012201380 A | 10/2012 | |
| JP | 2014031202 A | 2/2014 | |
| JP | 5574582 B2 | 8/2014 | |
| KR | 20090005746 A | 1/2009 | |
| WO | 2020157695 A1 | 8/2020 | |
| WO | 2020227813 A1 | 11/2020 | |

* cited by examiner

CLOSURE DEVICES AND MOLD COMPONENTS FOR MOLDING CLOSURE DEVICES

TECHNICAL FIELD

The present technology relates to injection molding, particularly with respect to injection molding of plastic articles such as closure devices for containers, such as beverage containers.

BACKGROUND

Containers, such as bottles, are generally provided with closure devices, such as caps, to fluidly seal the container. In recent years, it has become desirable to tether the closure device to the container in order to avoid losing the closure device. Not only is this a matter of convenience, but it is also becoming a legal requirement in certain jurisdictions.

Tethering of a closure device to its respective container includes certain mechanisms which allow an attachment of the closure device to a tamper-evidence (TE band) band at an open end of the container. Such mechanisms generally allow severing of frangible links between the closure device and the TE band during opening of the closure device yet allow the closure device to stay connected to the TE band and hence the container when in the open configuration. The typical mechanism also allows the closure device to be actuated between closed and open configurations.

In JP 5574582, there is described a cap 2 having a tongue 46 provided between two leashes. The tongue 46 abuts an annular ring 68 of the neck, allowing the cap to remain in the open position.

U.S. Pat. No. 9,010,555 describes a one-piece cap with two lines of weakness (20/34) which break when unscrewing the cap. The top portion of the cap remains attached to the TE band via a strip 36. A notch 32 separates bridges 301 and 302. However, there is no mechanism to maintain the cap in the open position.

In U.S. Pat. No. 6,474,491, there is described a cap having a tongue 21 between two film hinges 5. The two film hinges 5 are connected to a ring 3 via a respective arm 4. The tongue can abut the neck of the container when the cap is in the open position, allowing the cap to remain in the open position.

US 2012/0024815 describes a one-piece cap comprising a cut line 34 under a hinge 35 to extend a coupling length of a support ring 33 with a cap body 31. In some embodiments, the cap body 31 includes a wedge k1, which when opened, is retained between a support step 15 and the support ring 33.

In JP 49096441, a cap is described with two bands 40 acting as a hinge between the TE band 20 and the cap body 10. A hook 11 is provided between the bands 40. When the cap body 10 is removed, the hook 11 engages the TE band 20 and a jaw A of the neck portion.

WO 2020/157695 discloses a cap 1 comprising a closure element 6 configured to connect to a retaining ring 5 via a joining portion 8 that is itself connected to connecting bands 29, 30. When opening the closure element 6, the connecting bands 29, 30 are deformable such that both the closure 6 and entire joining portion 8 are rotatable relative to the neck 218 of a container.

Examples of tethered closure devices are disclosed in co-pending application number PCT/CA2020/050533, filed on 23 Apr. 2020, published as WO 2020/227813 on 19 Nov. 2020, and assigned to the assignee of the present application. The contents of WO 2020/227813 are incorporated by reference herein in their entirety. With respect to FIGS. 18A and 19 of WO 2020/227813, there is depicted an exemplary closure device 10 for a beverage container 24. The closure device 10 comprises, inter alia, a cap body 14 connected to a tamper band 16 via a retaining mechanism 22. The retaining mechanism 22 includes hinges 72, 74 disposed within an annular skirt of cap body 14. Because the hinges 72, 74 are located within the sidewall of the cap body 14 above the bottom edge thereof, slits (or voids) are included in the annular sidewall separating the hinges laterally from the sidewall so as to allow the cap body 14 to rotate about a horizontal axis running through the hinges at right angle to a central axis E-E' of the container 24.

Closures such as closure device 10 disclosed in WO 2020/227813 require a plurality of mold components (e.g., a mold cavity and lateral slides as well as a core) to form the cap body 14 so as to include hinges therein. This in turn complicates the molding process for forming such closures because of the need to readjust mold split-lines and include specialized material components for forming the outer mold core that results in poorer cooling. Thus, there is a need for an improved mold stack arrangement that allows for the use of standard mold stack configurations using mold cores with more optimal cooling properties. These and other advantages of the present invention are disclosed and claimed below.

SUMMARY

According to aspects of the present invention there are provided mold components for an injection molding machine that can mold a tethered closure for a container, such as a beverage container, that comprises hinges situated at or below a lower edge of a cap body.

Co-pending Application No. U.S. 63/148,654, filed on Feb. 12, 2021 (the contents of which are incorporated herein by reference in its entirety), assigned to the present applicant, discloses an improved tethered closure device in which the hinges are placed below the cap body. The inventors have discovered the following advantages for manufacturing such tethered closure devices, including: (1) the entire cap body 14 may be molded within a single mold component (e.g., a mold cavity insert) of a mold stack; (2) cut-outs within the mold to form the slits or voids between the hinges and the cap body 14 (or post-molding incisions to form such slits) are not required; (3) standard mold components may be used to form hinged closures (e.g., outer core mold components made from material with superior heat-transfer characteristics that cannot be used successfully to form cut-outs), allowing for lower cost and greater efficiency in manufacture; (4) ribs (or other such knurling) on the outer surface of the cap body may extend down further toward the bottom edge of the cap body, allowing easier opening (and closing) than prior art closures; and (5) thin layers of molding material (e.g., membranous areas) used to form the closure device may instead fill the slit or void areas in the cap bodies of prior art closures. Further to the last advantage listed, the inventors have discovered that the membranous areas occupying the areas that formerly contained slits or voids are of such cross-sectional thickness that they may be permanently deformed upon a first opening of the so-improved closure device, thus providing further evidence of a first opening of the closure device.

Accordingly, in certain aspects and embodiments of the present disclosure, there is provided a closure device for a container having a neck including an annular tamper evident flange or ring, the closure device comprising: a cap body; a tamper evident (TE) band positioned below the tamper evident annular flange when assembled in the container; a central protrusion extending radially from the cap body at a lower edge thereof; first and second hinge-connecting areas flanking the central protrusion; pockets defined in an inner surface of the cap body forming inner surfaces of the first and second hinge-connecting areas; a first hinge and a second hinge connected to the bottoms of the first and second hinge-connecting areas, respectively; leashes connected to the TE band, the first hinge and the second hinge; the leashes allowing for the cap body to be separated from the TE band during opening, but to remain connected thereto via the leashes; when the cap body is actuated from a closed configuration relative to the neck to a fully open position: the leashes are configured to retain the cap body to the TE band; an interaction of the central protrusion and the neck is configured to retain the cap body in the fully open position.

In yet other aspects and embodiments of the present disclosure, there is provided a mold for an injection molding machine that includes mold components by which tethered closure devices such as those described above may be molded. In one aspect, injection mold components suitable for molding such closure devices include, inter alia, a mold core component comprising raised projections thereon for forming pockets, or indentations, on an inner surface of a container cap body molded thereon, and configured to cooperate with a mold cavity component for forming membranous regions within the cap body proximate to the pockets (or indentations) flanking thicker areas that may be connected to hinges situated at or below a lower edge of the cap body.

In a second aspect, an outer core mold component comprising raised projections thereon may further comprise a material having desirable heat transfer properties. In certain embodiments, the outer core mold component material may comprise copper or copper alloys.

BRIEF DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a mold apparatus for molding a closure device, such as a closure device for a beverage container. It should be understood that other non-limiting embodiment(s), modifications and equivalents will be evident to one of ordinary skill in the art in view of the non-limiting embodiment(s) disclosed herein and that these variants should be considered within scope of the appended claims.

Furthermore, it will be recognized by one of ordinary skill in the art that certain structural and operational details of the non-limiting embodiment(s) discussed herein may be modified or omitted (i.e. non-essential) altogether. In other instances, well known methods, procedures, and components have not been described in detail.

Figure 2:
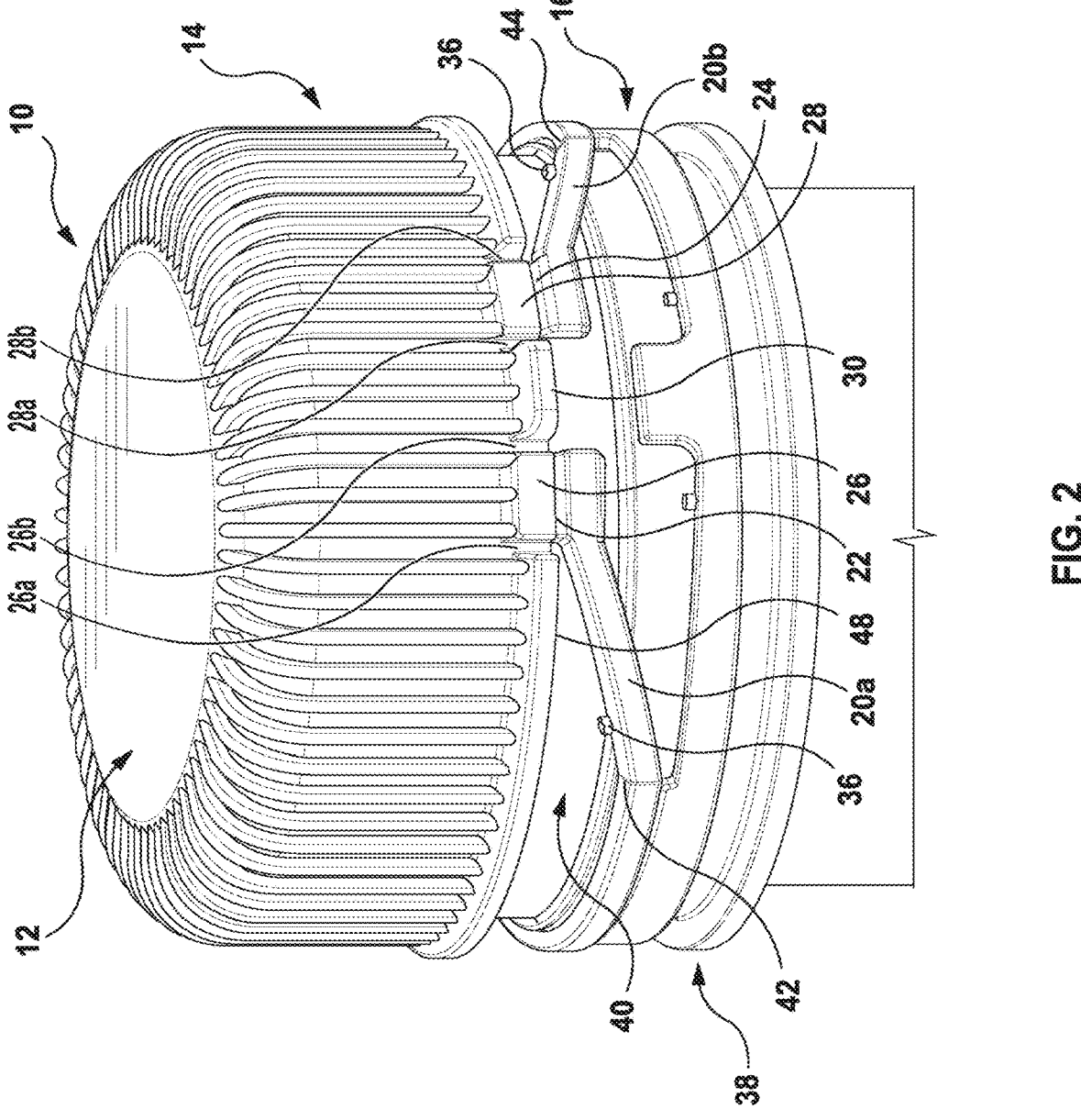
FIG. 2 is a side perspective view of the closure device of FIG. 1 on a container when the closure device is in the closed and unlocked configuration, in accordance with some non-limiting embodiments of the present technology.

According to non-limiting embodiments of the present technology, there is provided a closure device 10 for a container 38 (FIG. 2). The container to which the closure device 10 may be affixed is not limited to particular uses, configurations, or materials. In the embodiments illustrated herein, the container may be a bottle, such as a drink bottle made of polyethylene terephthalate (PET). For example, the container can be a blow-molded bottle for containing a still water beverage or another flat beverage. Alternatively, the container can be for a carbonated beverage. In yet further embodiments, the container can be for a hot fill type of beverage. However, the closure device can be used with other types of containers.

Figure 1:
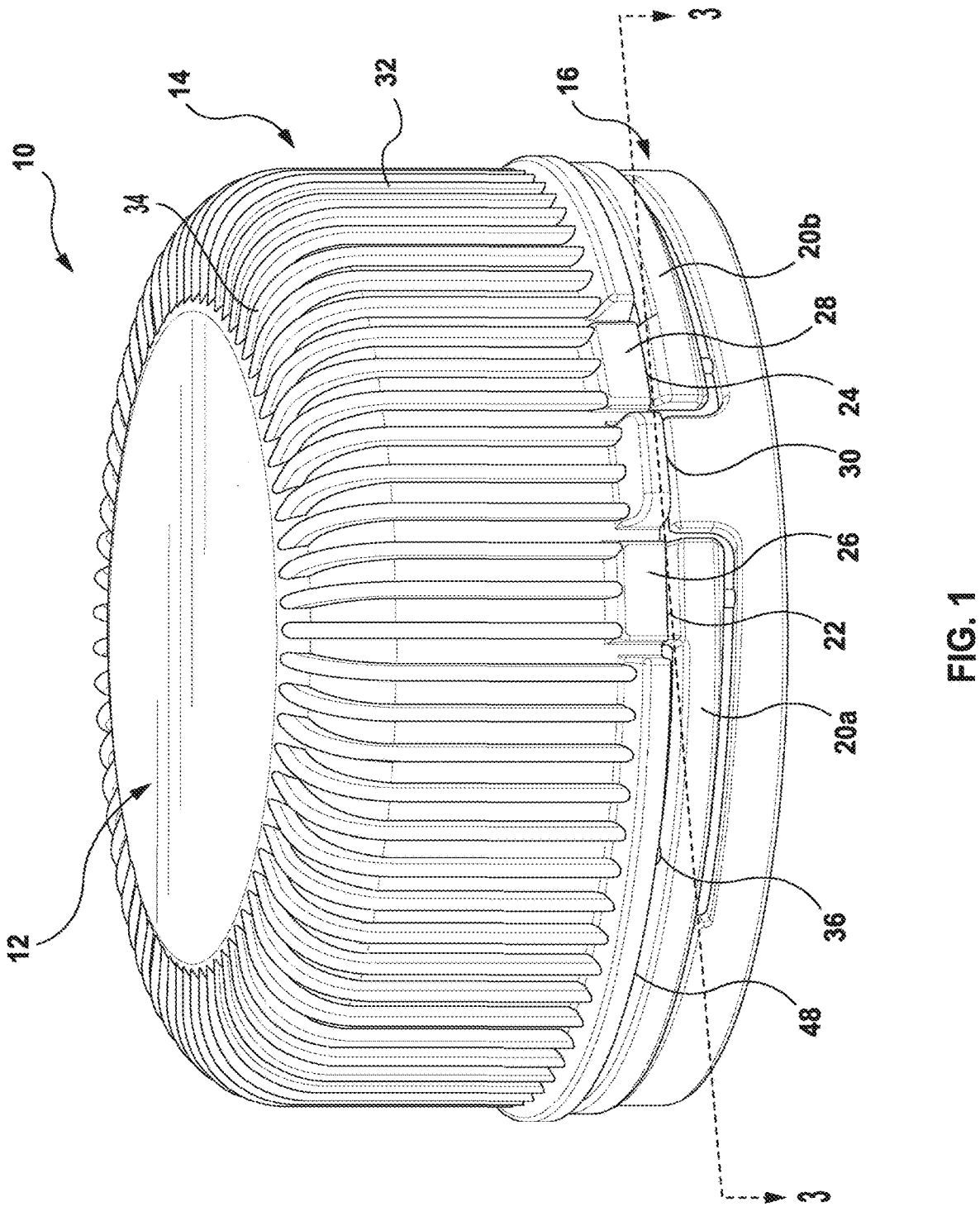
FIG. 1 is a side perspective view of an embodiment of a closure device when the closure device is in a closed and locked configuration, in accordance with some non-limiting embodiments of the present technology.
Figure 6:
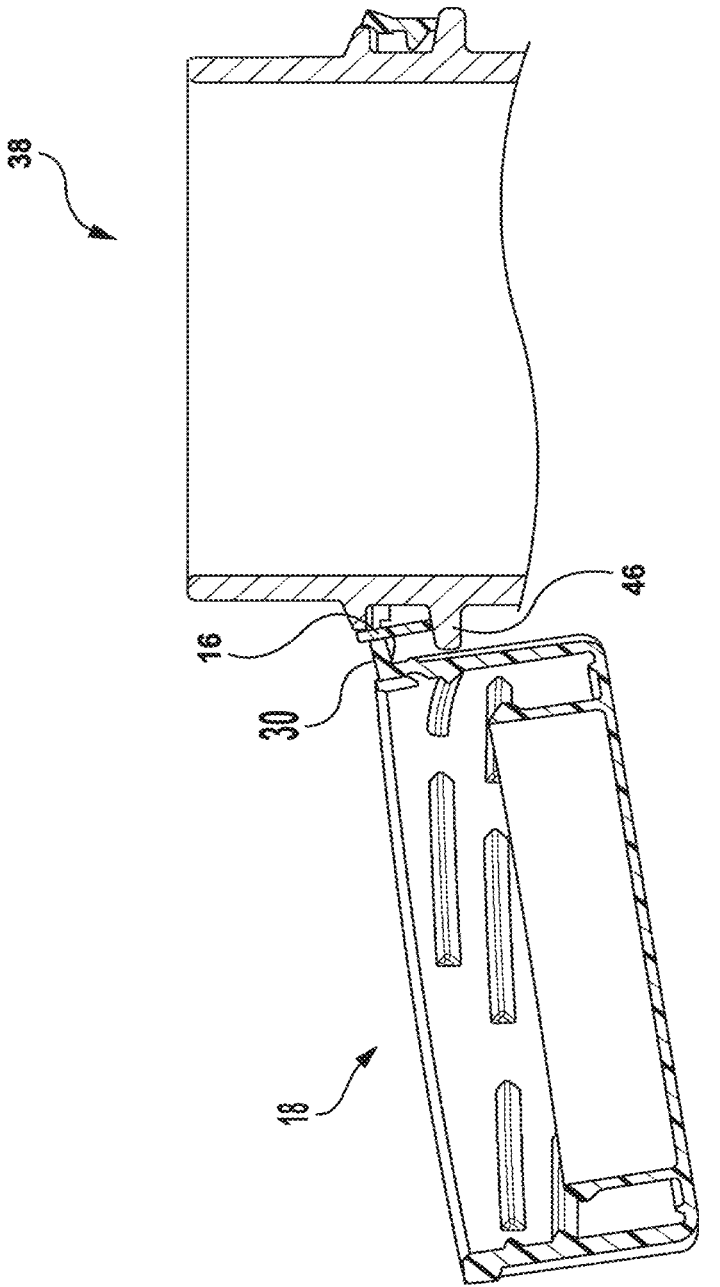
FIG. 6 is a lateral cross-sectional view of the closure device of FIG. 1, when the closure device is in a fully open position of an open configuration, in accordance with some non-limiting embodiments of the present technology.

Referring initially to FIGS. 1 and 2, the closure device 10 comprises a substantially cylindrical cap body (or shell) 14 closed at one end and frangibly connected to a tamper evident band (TE band) 16 and movable between a closed configuration (also referred to as "closed position") (FIGS. 1 and 2) and an open configuration (also referred to as "open position") (FIG. 6). The cap body 14 is configured to be actuated between the closed position to the fully open position, and from the fully open position to the closed position. The closed configuration has a locked mode (FIG. 1) and an unlocked mode (FIG. 2). In the open position, a number of different open positions are possible, including a fully open position in which the closure may be maintained in the fully open position via an interference connection (FIG. 6).

As introduced above, referring again to FIGS. 1 and 2 the closure device 10 comprises a cap body 14 that is generally circular cylindrical (i.e., tube-like) in shape and has a closed first end 12 and an open second end 18. The cap body 14 is arranged to be received over an open end of a container 38 and to be frangibly connected to TE band 16 via frangible connections 36. The cap body 14 is also connected to TE band 16 by leashes 20a, 20b via hinges 22, 24 which are themselves connected to hinge-connecting regions 26, 28 on the cap body 14. Hinge-connecting regions 26, 28 are areas of relatively large cross-sectional thickness (compared to membranous areas flanking them, as further described below) above the bottom edge 48 of the cap body 14 and are connected to leashes 20a, 20b via hinges 22, 24 as further explained below.

A central protrusion 30 extends radially outward from the cap body 14 between hinge-connecting regions 22, 24 such that a lower edge of central protrusion 30 is substantially co-planar with a bottom edge 48 of the cap body 14. As explained below, the central protrusion 30 is configured to interact with the TE band 16 when in the fully opened position (FIG. 6) in an interference relationship to reversibly maintain the closure 10 in the fully open position on the container 38.

Figure 3:
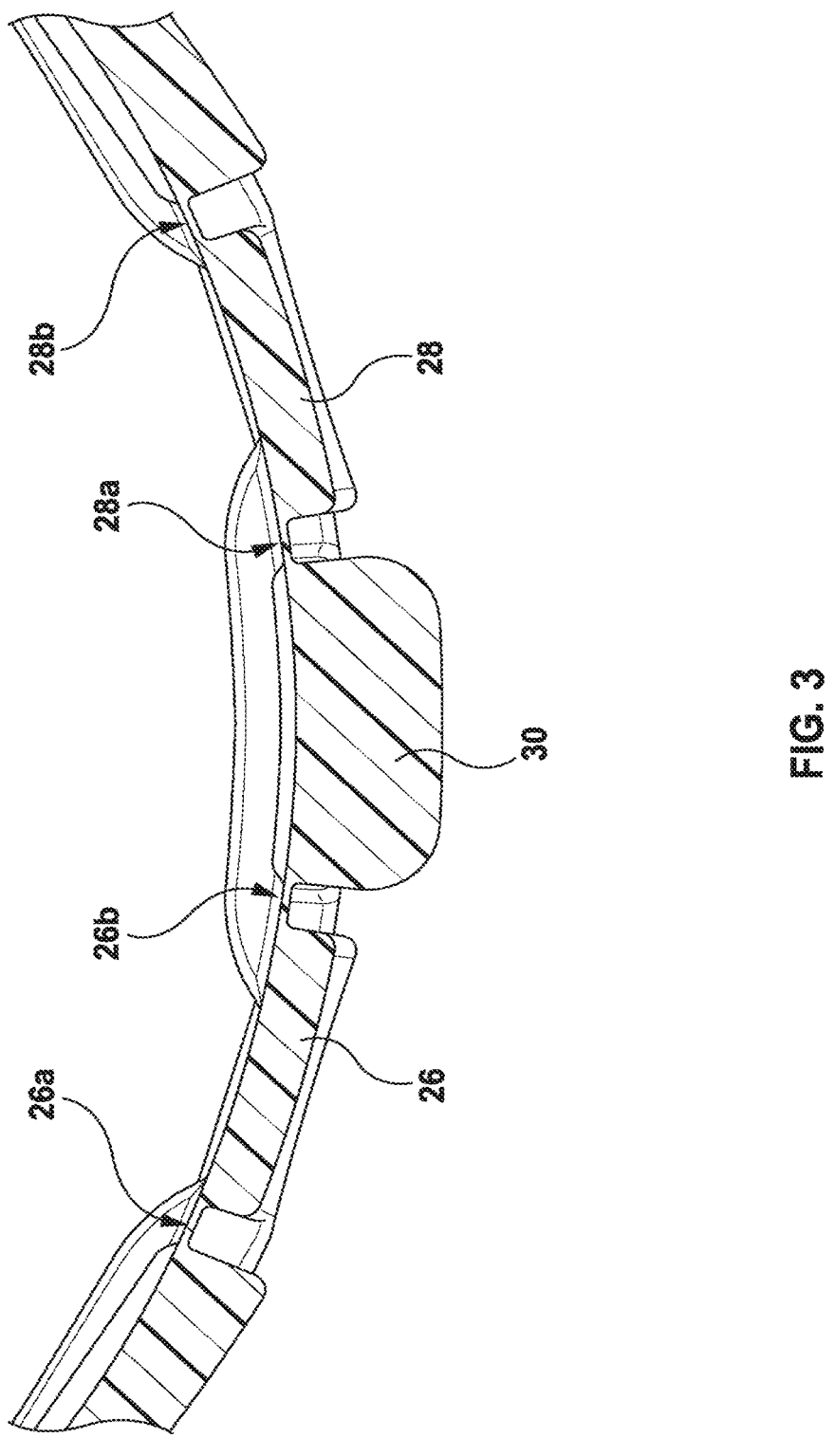
FIG. 3 is a transverse cross-sectional view of a portion of the closure device of FIG. 1 taken along section line 3-3.
Figure 4:
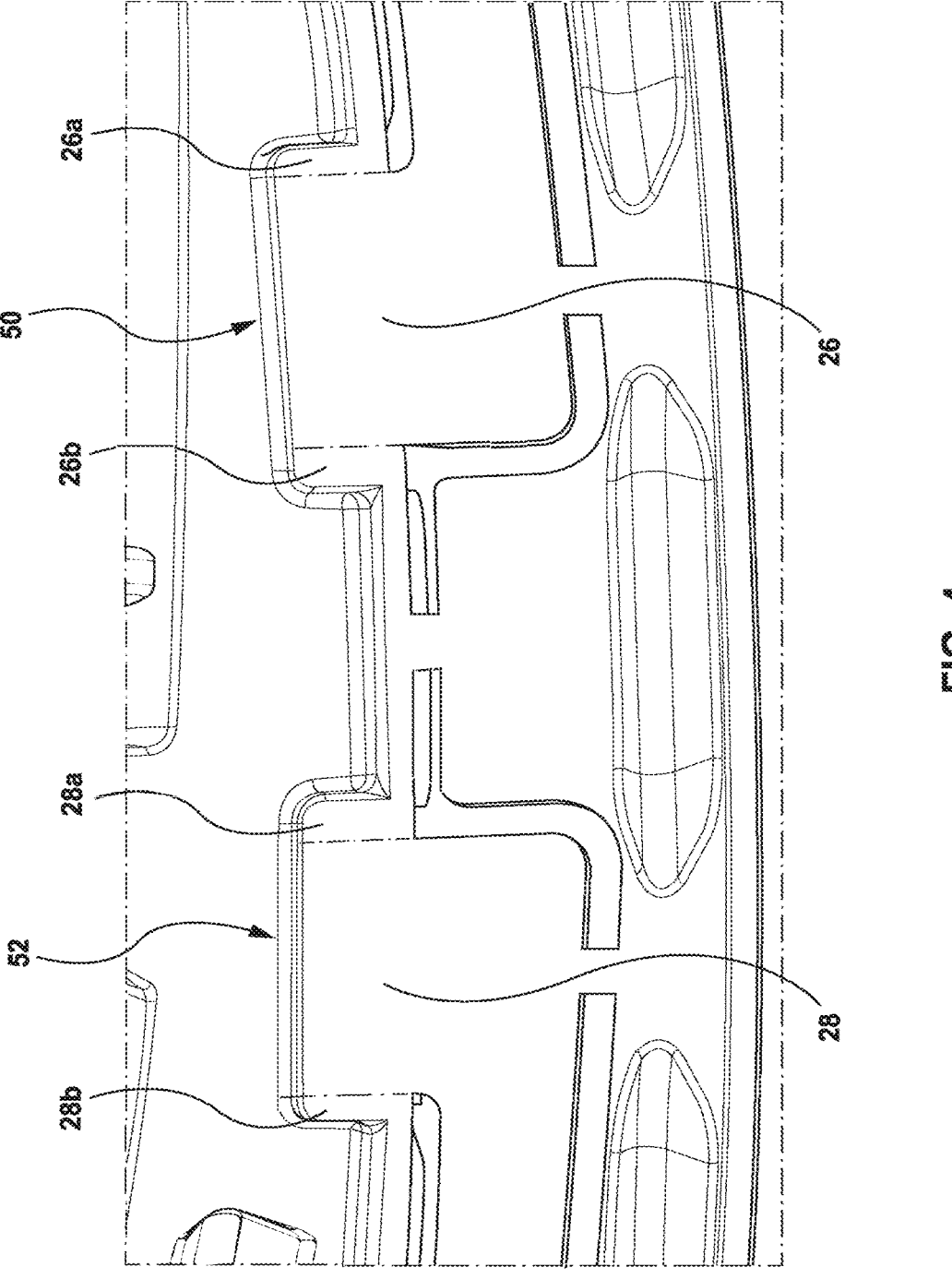
FIG. 4 is a perspective view of a section of an inner wall of a closure device according to the present technology.

As best illustrated in FIG. 3, on either side of the hinge-connecting regions 26, 28 are membranous areas (or zones) 26a, 26b, 28a, 28b of substantially lesser transverse cross-sectional thickness than the central protrusion 30, the hinge-connecting regions 26, 28, and the remainder of the circumference of the cap body 14. Referring to FIG. 4, the reduced cross-sectional thickness of membranous areas 26a, 26b, 28a, 28b is achieved by molding pockets, or indentations 50, 52 into the inner wall of the cap body 14. As seen in FIG. 4, pocket 50 comprises the inner surfaces of hinge-connecting region 26 and membranous areas 26a and 26b, and pocket 52 comprises the inner surfaces of hinge-connecting region 28 and membranous areas 28a and 28b.

Figure 5:
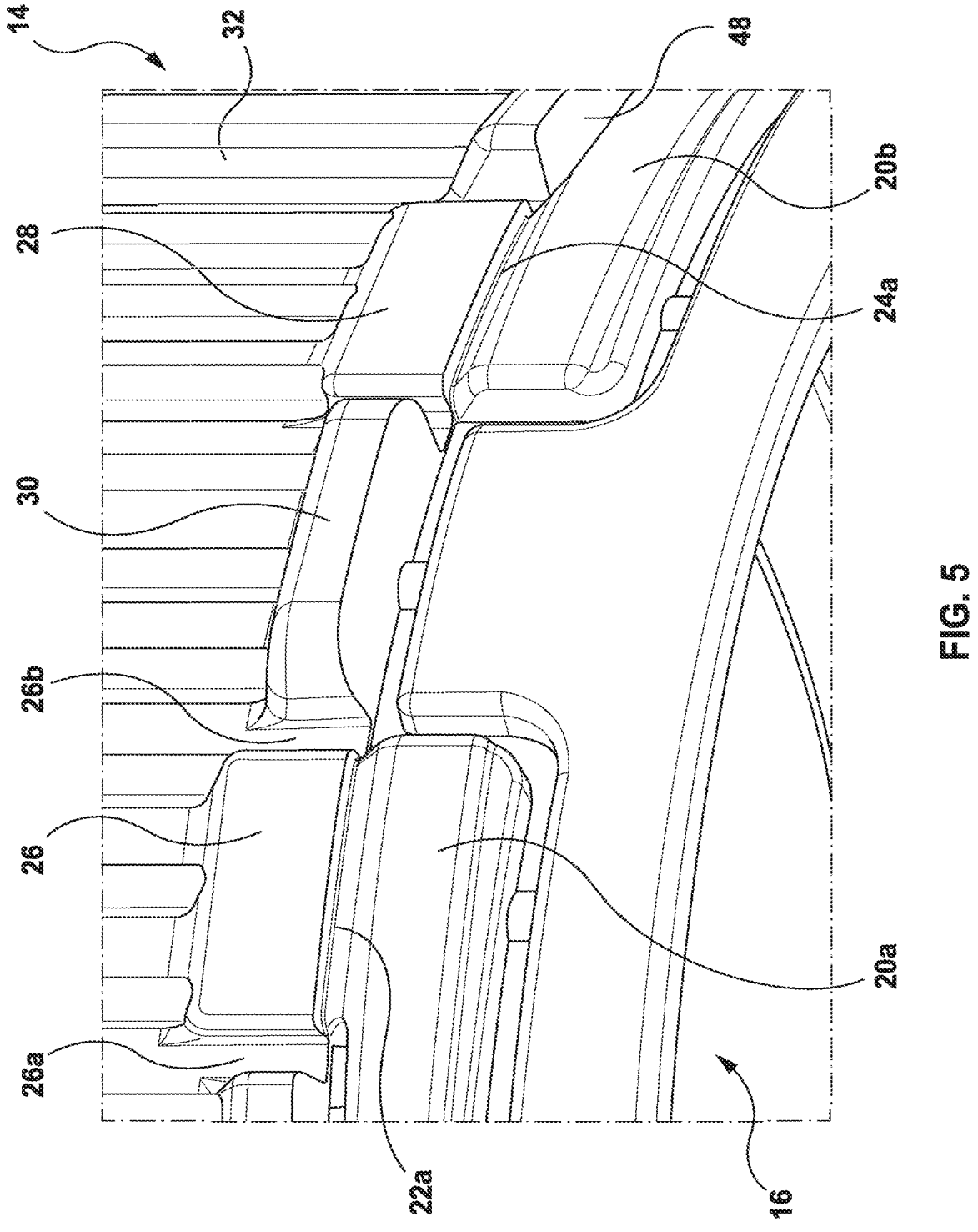
FIG. 5 depicts a zoomed-in perspective view of the hinge features of the closure device of FIG. 1.

As introduced above, hinges 22, 24 extend downwardly from hinge-connecting regions 26, 28 (as depicted in FIGS. 1 and 2). The opposite ends of the hinges 22, 24 (distally from hinge-connecting regions 26, 28) are connected to leashes 20a, 20b, respectively. As shown in FIG. 5, the hinges 22, 24 may have one or more grooves 22a, 24a defined on outwardly facing surfaces thereon at or below the plane of the bottom edge 48 of the cap body 14 to facilitate opening (and closing) of the closure device 10.

The outer surface 32 of the cap body 14 (FIG. 1) is textured to facilitate gripping of the cap body 14. As seen in FIGS. 1 and 2, the texturing comprises the plurality of ribs 34 (also known as "knurls") extending longitudinally between the first end 12 substantially to the bottom edge 48 of cap body 14. It should be noted that the sizing and the pattern of the plurality of ribs 34 is not limited to those depicted herein. It is also noted that in alternative embodiments of the present technology, the plurality of ribs 34 can be omitted altogether.

The cap body 14 is also connected to the TE band 16 by the plurality of frangible links (bridges) 36 (FIG. 1). The links 36 are arranged to be severed when the cap body 14 is rotated relative to the neck of the container 38 (FIG. 2). The tensile strength of the links 36 are lower than the tensile strength of the cap body 14 and TE band 16 such that the links 36 will be severed before damage to the cap body 14 or TE band 16 can occur.

In use, in the locked closed configuration (FIG. 1), the cap body 14 is retained over the open end of the container 38, adjacent the TE band 16, and connected thereto by one or more of the links 36 (when they are intact) and the concatenation of hinge-connecting regions 26, 28/hinges 22, 24/leashes 20a, 20b to form a retaining mechanism 40 (FIG. 2).

In the unlocked closed configuration (FIG. 2), the links 36 are severed and the cap body 14 is connected to the TE band 16 by means of the retaining mechanism 40 only. The cap body 14 is moveable between the closed configuration (FIG. 2) (in the unlocked mode) to the fully open configuration (FIG. 6) through a hinged movement proximate the grooves 22a, 24a of the hinges 22, 24 at or below the plane defined by the bottom edge 48 of the cap body 14.

Attention is now turned to the retaining mechanism 40, which enables retention of the cap body 14 on the container 12 in the locked and unlocked closed configurations, and also enables retention of the cap body 14 in open configurations.

As best seen in FIGS. 1 and 2, the retaining mechanism 40 comprises the first and second hinge-connecting regions 26, 28, first and second hinges 22, 24 and first and second leashes 20a, 20b. In the embodiment of FIGS. 1 and 2, the first leash 20a connects the TE band 16 to the first hinge 22, and the second leash 20b connects the TE band 16 to the second hinge 24. The first leash 20a is connected to the TE band 16 at the first connection point 42 and the second leash 20b is connected to the TE band 16 at the second connection point 44. The first and second connections points 42, 44 are positioned one on either side of the first and second hinges 22, 24. A length of the first leash 20a and the second leash 20b is sufficient to enable the removal of the cap body 14 from the neck of the container 38.

The first and second hinges 22, 24 are spaced from one another circumferentially at or below the plane of the bottom of the cap body 14. Each of the first and second hinges 22, 24 may comprise a groove 22a, 24a running substantially parallel to the plane formed by the bottom edge 48 of the cap body 14. Each hinge 22, 24 is bendable about a common axis running substantially along the axes of grooves 22a, 24a below the plane of the bottom edge 48 of cap body 14 to allow relative axial movement of the cap body 14 relative to the TE band 16. This is also referred to as a "flip-top" arrangement. The connection between the first and second connections points 42, 44 to the hinges 22, 24 and the leashes 20a, 20b are not hinged connections.

The lengths of the leashes 20a, 20b allow a degree of rotational movement of the cap body 14 to break the frangible links 36, positioned between the TE band 16 and the leashes 20a, 20b, respectively, and to disengage threads (not shown) on the neck of the container 38.

Referring again to FIG. 6, the engagement of central protrusion 30 against the TE band 16, and the contact of a portion of the outer surface 32 of the cap body 14 against a support ring 46 on the neck of the container 12 serves to retain the position of the TE band 16 relative to the neck of the container 12 when the closure device 10 is in the fully open positions.

Figure 7:
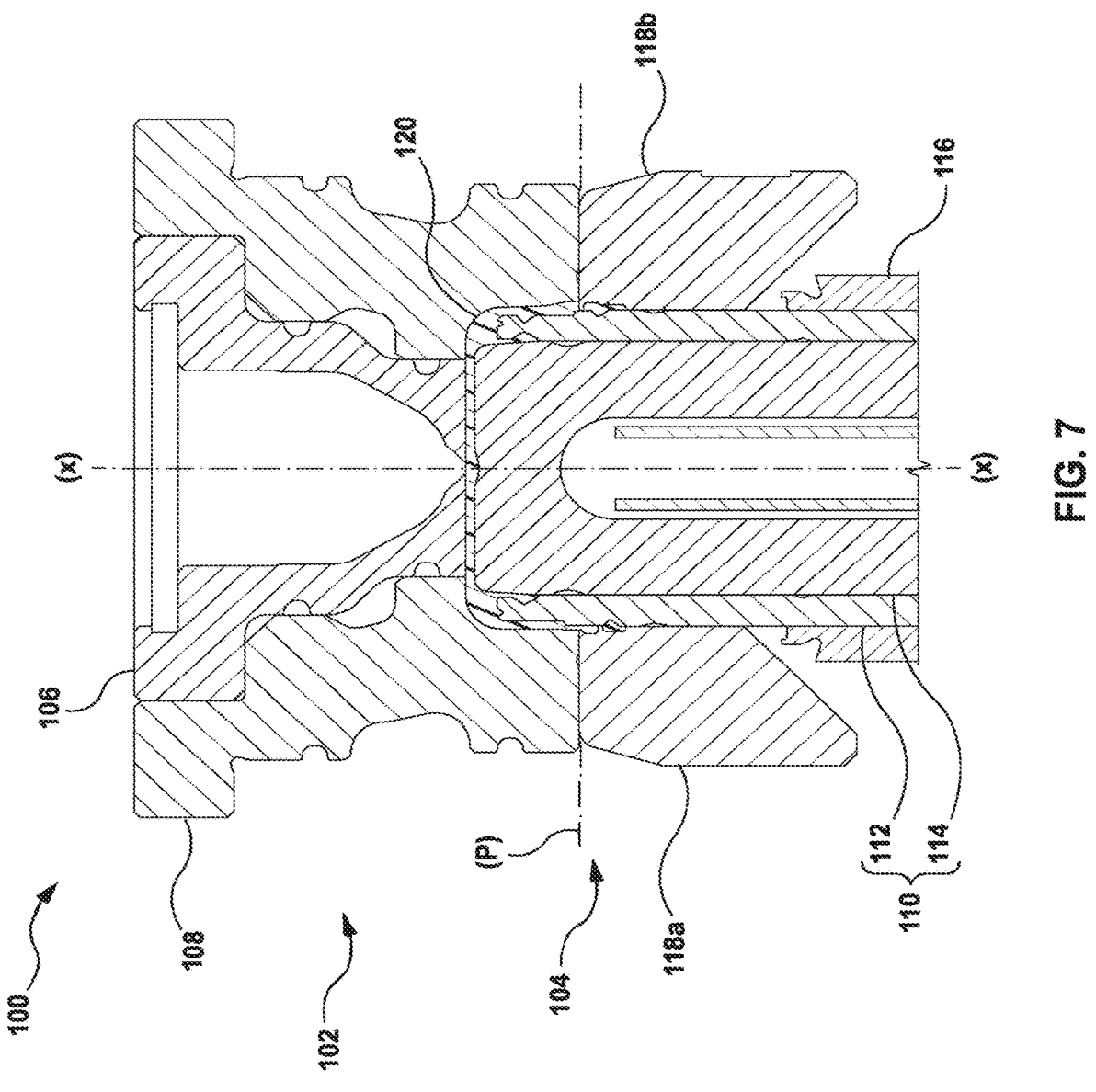
FIG. 7 is a cross-sectional view of a mold of an injection molding machine in accordance with some non-limiting embodiments of the present technology.

Referring now to FIG. 7, there is depicted a mold 100 configured to mold closure devices such as the closure device 10 described above. The mold 100 comprises a cavity portion 102 and a core portion 104 oriented generally axially symmetrically about a mold axis (X)-(X). Cavity portion 102 includes a gate insert 106 nested within a cavity insert 108. Core portion 104 includes a core 110, itself comprised of an outer core 112, and an inner core 114, a stripper ring 116, and slides 118a, 118b. When the mold is closed, slides 118a, 118b abut cavity insert 108 at right angles to mold axis (X)-(X), forming parting line (P), and abut outer core 112 parallel to mold axis (X)-(X). Of course, mold 10 may comprise additional components not shown in FIG. 7, including core plate(s), stripper plate(s), cooling channel(s), actuator(s), etc., as would be understood by those of skill in the art of injection molding, which additional components are not described further herein.

Further with respect to FIG. 7, core 110 defines inner surfaces of molding cavity 120, while gate insert 106, cavity insert 108, and slides 118a, 118b, define outer surfaces of molding cavity 120. Molding cavity 120 is thus configured to mold closure devices, such as closure device 10 (FIG. 1).

Figure 8:
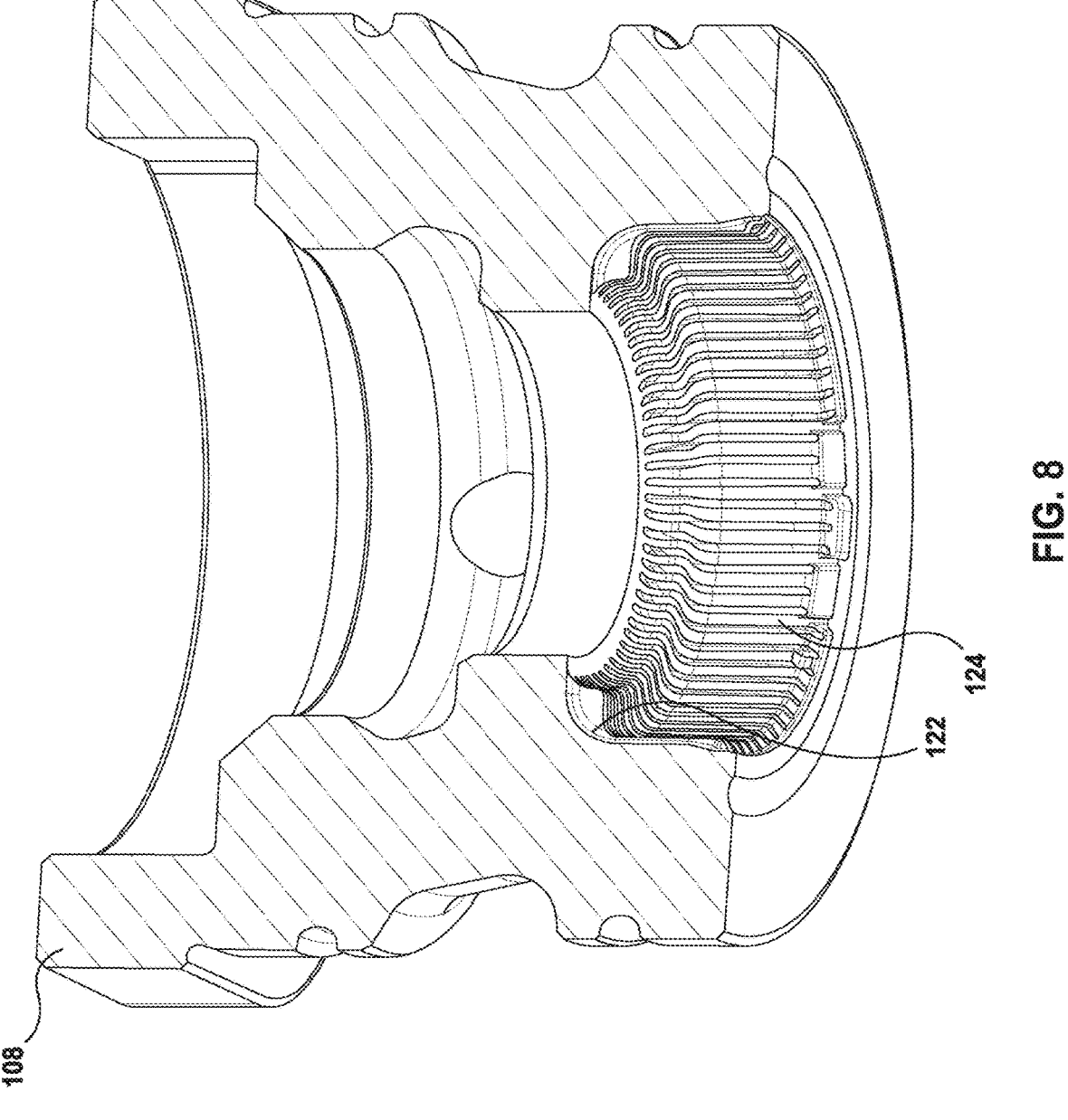
FIG. 8 is a perspective, cross-sectional view of a mold cavity component of an injection molding machine.
Figure 9:
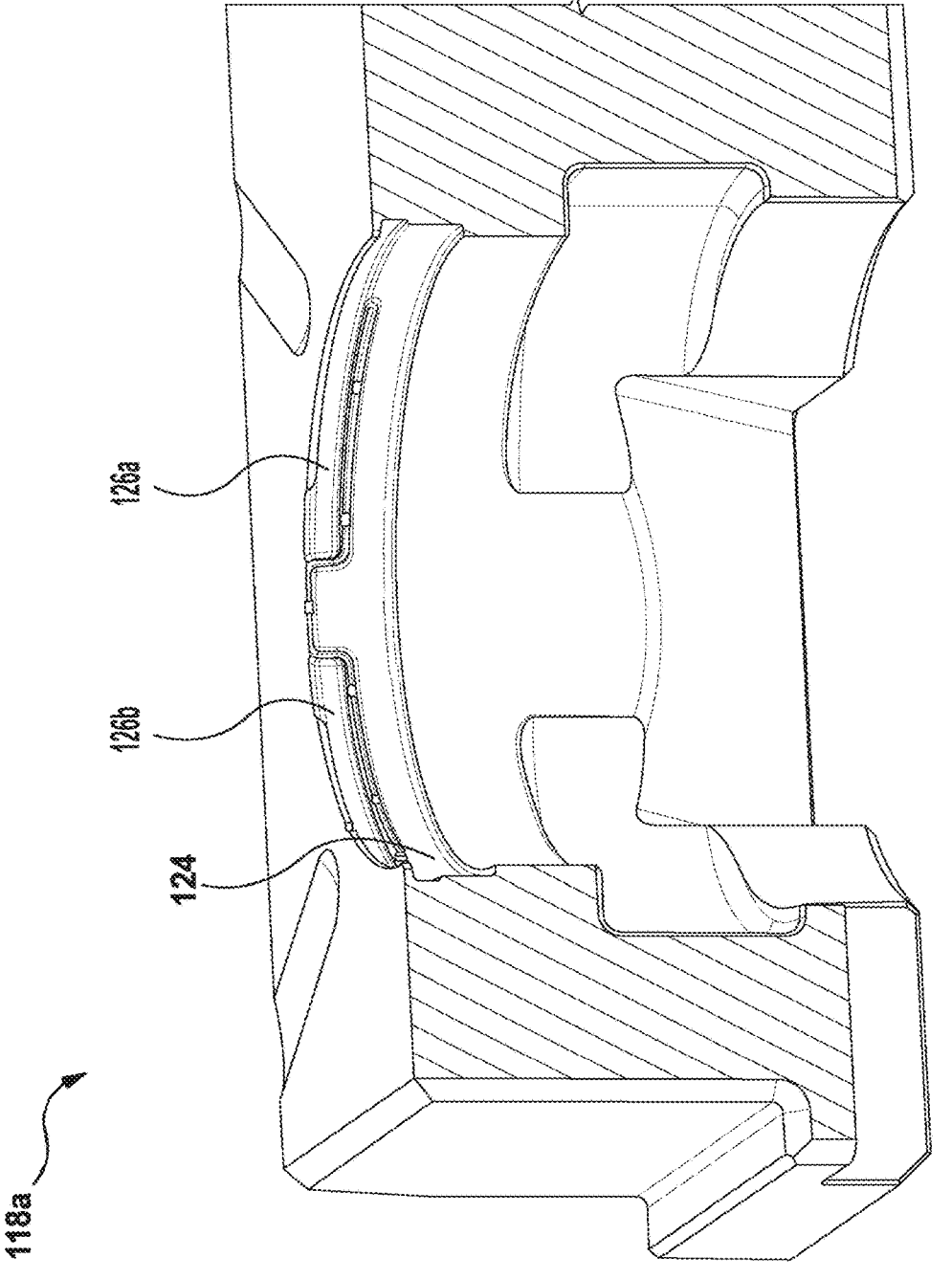
FIG. 9 is a perspective, cross-sectional view of a slide component of an injection molding machine.
Figure 10:
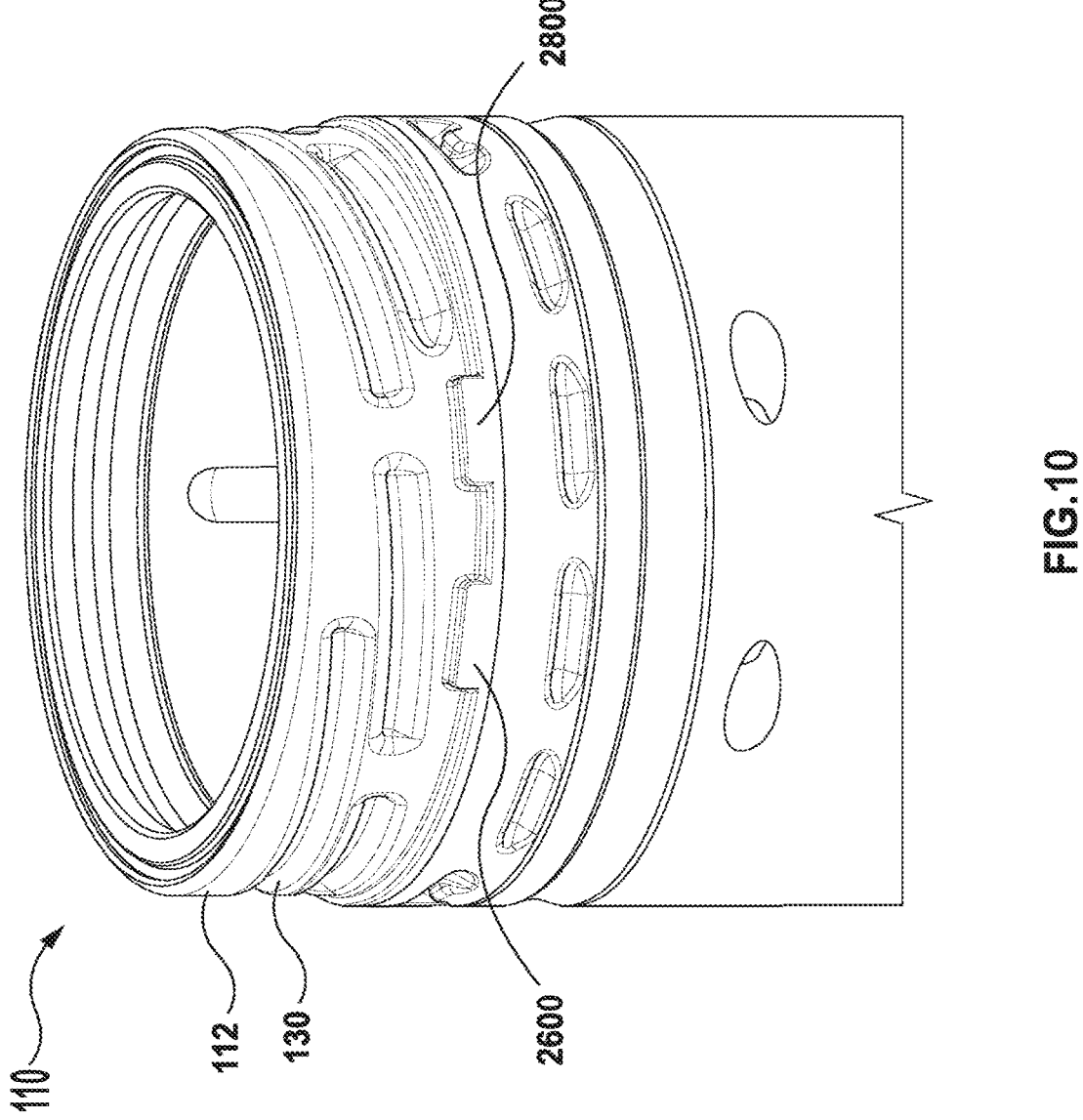
FIG. 10 is a perspective view of a mold core component of an injection molding machine.

Referring now to FIGS. 8 through 10, details of molding cavity 120 will be described further.

FIG. 8 depicts a perspective cross-sectional view of cavity insert 108. As can be seen in FIG. 8 inner surface 122 of cavity insert 108 provides the molding surface for outer surface 32 of the cap body 14 of closure device 10 (FIG. 1). In some embodiments, inner surface 122 of cavity insert 108 may comprise grooves, or channels 124 for molding ribs or knurls 34 on outer surface 32 of the cap body 14 of closure device 10 (FIG. 1), although other embodiments may exclude this feature.

Figure 8A:
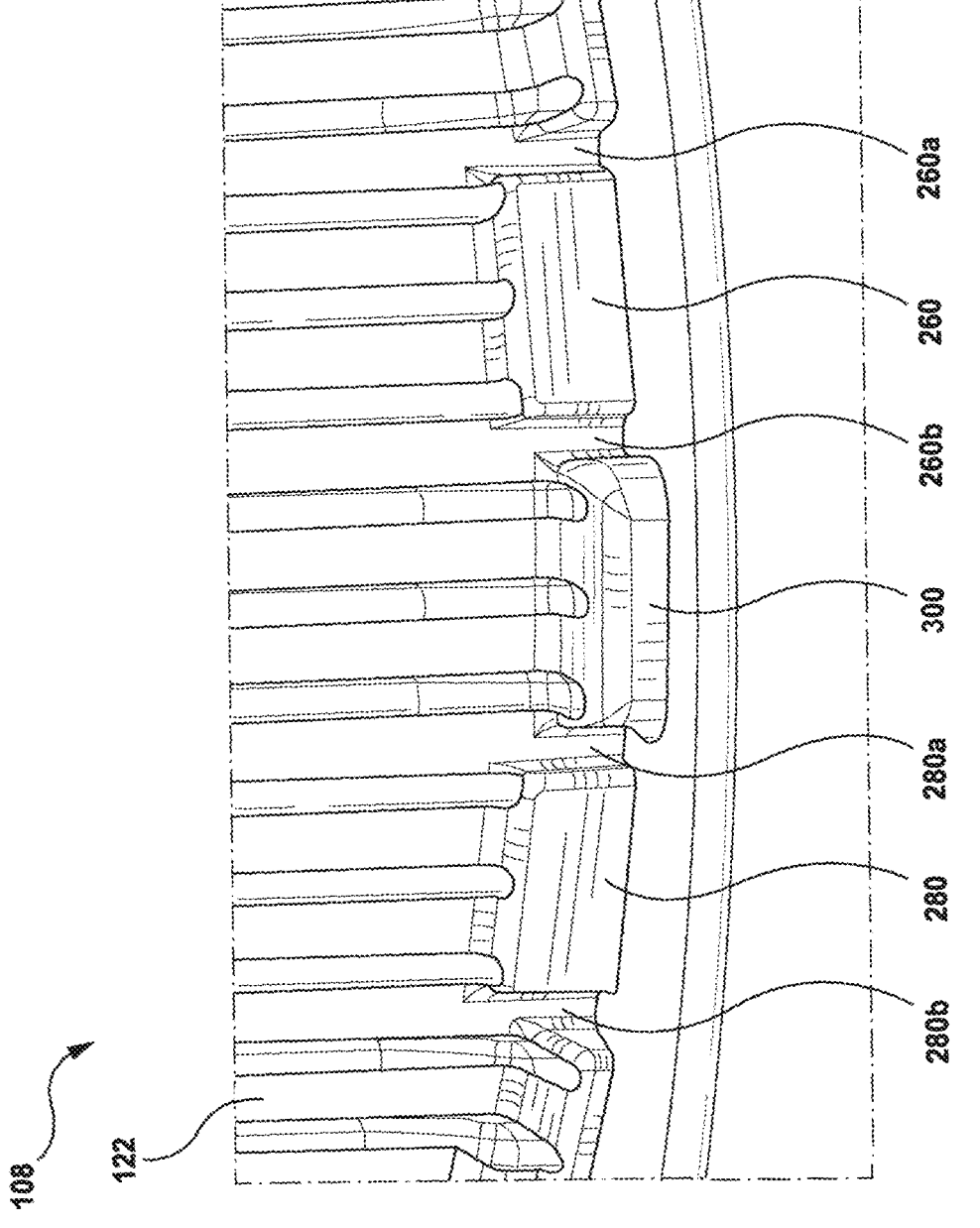
FIG. 8A is a perspective view of a section of an inner wall of a mold cavity component of an injection molding machine.

As shown in greater detail in FIG. 8A, inner surface 122 of cavity insert 108 may also comprise recesses 260, 280, and 300 configured for forming hinge-connecting regions 26, 28 and central protrusion 30, respectively, on outer surface 32 of the cap body 14 of closure device 10 (FIG. 1).

FIG. 9 depicts a perspective cross-sectional view of slide 118a. As can be seen in FIG. 9, inner surface 124 of slide 118a provides recessed molding surfaces 126a, 126b for leashes 20a, 20b, hinges 22, 24, and half of TE band 16 of closure device 10 (FIG. 1). As would be apparent to those of skill in the art, inner surface 122 of cavity insert 108, inner surface 124 of slide 118a, inner surfaces of slide 118b (not shown) and inner surface of gate insert 106 (not shown) cooperate together to form the outer surface of closure device 10 (FIG. 1). Of course, other components may be included or substituted for gate insert 106, cavity insert 108, and slides 118a, 118b to form the outer surface of closure device 10 without departing from the spirit and scope of the present invention herein described. For example, in some embodiments, cavity insert 108 and gate insert 106 may be joined to comprise a single, unitary mold gate/cavity component.

FIG. 10 depicts a perspective view of core 110. Projections 2600, 2800 are formed on the outer surface of outer core 112 for forming pockets 50, 52 in the inner wall of the cap body 14 of closure device 10 (FIG. 4). As also can be seen in FIG. 10, in one embodiment outer surface of outer core 112 may comprise one or more recesses 130 for forming one or more threads on the inner surface of the cap body 14 of closure device 10 (not shown), although in other embodiments, thread(s) need not be included.

By virtue of the present invention, outer core 112 and/or inner core 114 may comprise standard core materials possessing desirable heat transfer properties for cooling core 110 during the molding cycle to allow sufficient cooling of closure device 10 at the end of each molding cycle to allow ejection thereof from the mold without permanent deformation. In some embodiments, the material(s) comprising outer core 112 and inner core 114 may comprise copper and/or copper alloys. Of course, in other embodiments the material(s) comprising outer core 112 and inner core 114 may comprise other materials possessing acceptable heat transfer characteristics.

Those of skill in the art will appreciate that FIG. 7 depicts mold 10 in a "mold closed" configuration in which a closure device 10 (FIG. 1) may be molded in molding cavity 120. As would also be appreciated by those of skill in the art, after closure device 10 is formed in molding cavity 120 and sufficiently cooled, mold 100 is converted to a "mold open"

configuration (not shown) as core portion 104 moves away from cavity portion 102 along mold axis (X)-(X), slides 118a and 118b move laterally away from core 110 perpendicularly to mold axis (X)-(X), and stripper ring 116 is actuated toward cavity portion 102 to urge closure device 10 off core 110, as is known in the art.

It is noted that the foregoing has outlined some of the more pertinent non-limiting embodiments. These non-limiting embodiments may be used for many applications. Thus, although the description is made for particular arrangements and methods, the intent and concept of these non-limiting embodiments may be suitable and applicable to other arrangements and applications. It will be clear to those skilled in the art that modifications to the disclosed non-limiting embodiments can be affected. The described non-limiting embodiments ought to be construed to be merely illustrative of some of the more prominent features and applications thereof. Other beneficial results can be realized by applying these non-limiting embodiments in a different manner or modifying them in ways known to those familiar with the art. This includes the mixing and matching of features, elements and/or functions between various non-limiting embodiments is expressly contemplated herein, unless described otherwise, above.

The invention claimed is:

1. A closure device for a beverage container comprising:
   a cylindrical body with a closed end and an open end, the cylindrical body forming a bottom edge that extends entirely along a single plane;
   a central protrusion extending radially outwardly from the bottom edge of the cylindrical body;
   a first hinge-connecting area and a second hinge-connecting area flanking the central protrusion on either side thereof;
   a first pocket formed in an interior wall of the cylindrical body defining an inner surface of the first hinge-connecting area;
   a second pocket formed in the interior wall of the cylindrical body defining an inner surface of the second hinge-connecting area;
   a first hinge extending downwardly from the first hinge-connecting area, the first hinge positioned at or below the single plane of the bottom edge of the cylindrical body, the first hinge comprising a first groove formed on an outwardly facing surface thereof at or below the single plane of the bottom edge;
   a second hinge extending downwardly from the second hinge-connecting area, the second hinge positioned at or below the single plane of the bottom edge of the cylindrical body, the second hinge comprising a second groove formed on an outwardly facing surface thereof at or below the single plane of the bottom edge;
   a first leash connected to a bottom of the first hinge at a first end and to a tamper band at a second end; and
   a second leash connected to a bottom of the second hinge at a first end and to the tamper band at a second end, wherein the first and second leashes are positioned entirely below the single plane,
   wherein a length of the first and second leashes extends along a circumference of the closure device, and
   wherein the tamper band is further connected to the bottom edge of the cylindrical body via frangible connections.

2. The closure device of claim 1, further comprising: a first membranous area adjacent the first hinge-connecting area distally from the central protrusion.

3. The closure device of claim 2, further comprising:
a second membranous area adjacent the second hinge-connecting area distally from the central protrusion.

4. The closure device of claim 3, further comprising:
the first pocket formed in the interior wall of the cylindrical body also defining an inner surface of the first membranous area.

5. The closure device of claim 4, further comprising:
the second pocket formed in the interior wall of the cylindrical body also defining an inner surface of the second membranous area.

6. The device of claim 5, further comprising:
a third membranous area between the central protrusion and the first hinge-connecting area,
the first pocket formed in the interior wall of the cylindrical body also defining an inner surface of the third membranous area.

7. The closure device of claim 6, further comprising:
a fourth membranous area between the central protrusion and the second hinge-connecting area,
the second pocket formed in the interior wall of the cylindrical body also defining an inner surface of the fourth membranous area.

8. The closure device of claim 1, wherein the first and second hinge-connecting areas project radially outward from an outer surface of the cylindrical body.

9. The closure device of claim 1, wherein the first groove, the second groove, and a bottom surface of the central protrusion are positioned at and extend parallel to the bottom edge of the cylindrical body.

10. A molding apparatus for injection molding a closure device for a container, comprising:
a cavity mold component; and
a core mold component,
wherein the cavity mold component and the core mold component cooperate to form a molding cavity for molding a closure device comprising:
a cylindrical body with a closed end and an open end, the cylindrical body forming a lower edge that extends entirely along a single plane;
a central protrusion extending radially outwardly from the lower edge of the cylindrical body;
a first hinge-connecting area and a second hinge-connecting area flanking the central protrusion;
a first hinge extending downwardly from to the first hinge-connecting area and a second hinge extending downwardly from to the second hinge-connecting area, the first and second hinges positioned at or below the single plane, wherein the first and second hinges each comprise a groove positioned on an outwardly facing surface thereof at or below the single plane,
a first leash connected to a bottom of the first hinge at a first end and to a tamper band at a second end;
a second leash connected to a bottom of the second hinge and to the tamper band at a second end,
wherein the first and second leashes are positioned entirely below the single plane,
wherein a length of the first and second leashes extends along a circumference of the cylindrical body, wherein the tamper band is further connected to the lower edge of the cylindrical body via frangible connections,
the core mold component comprising projections configured to form pockets in an interior wall of the cylindrical body defining inner surfaces of the first and second hinge-connecting areas.

11. The molding apparatus of claim 10, further comprising:
the cavity mold component comprising recesses positioned proximate the projections for forming the first and second hinge-connecting areas of the closure device during an injection molding process.

12. The molding apparatus of claim 11, further comprising:
the cavity mold component comprising a recess positioned between the recesses for forming the central protrusion on the closure device during the injection molding process.

13. The molding apparatus of claim 10 further comprising:
a first slide component comprising recessed molding surfaces positioned at a top edge of an inner surface thereof for forming the first and second leashes, the first and second hinges and half of the tamper band of the closure device.

14. The molding apparatus of claim 10 further comprising:
the cavity mold component comprising grooves on an inner molding surface for forming knurls on an outer surface of the cylindrical body of the closure device.

15. The molding apparatus of claim 10 further comprising: the core mold component comprising copper or a copper alloy.

* * * * *